(12) United States Patent
Dervovic et al.

(10) Patent No.: US 12,443,626 B2
(45) Date of Patent: Oct. 14, 2025

(54) METHOD AND SYSTEM FOR EVALUATION OF CLASSIFICATION MODELS

(71) Applicant: JPMorgan Chase Bank, N.A., New York, NY (US)

(72) Inventors: Danial Dervovic, London (GB); Michael Cashmore, Stirlingshire (GB); Daniele Magazzeni, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/378,484

(22) Filed: Oct. 10, 2023

(65) Prior Publication Data

US 2025/0117404 A1    Apr. 10, 2025

(51) Int. Cl.
   *G06F 16/00* (2019.01)
   *G06F 11/34* (2006.01)
   *G06F 16/28* (2019.01)
(52) U.S. Cl.
   CPC ........ *G06F 16/285* (2019.01); *G06F 11/3452* (2013.01)
(58) Field of Classification Search
   CPC .................................................... G06F 16/285

USPC ......................................................... 707/737
See application file for complete search history.

(56) References Cited

U.S. PATENT DOCUMENTS

2024/0362223 A1* 10/2024 Lougovtsov ........ G06F 11/3419
                                                     707/707

* cited by examiner

*Primary Examiner* — Alexandria Y Bromell
(74) *Attorney, Agent, or Firm* — GREENBLUM & BERNSTEIN, P.L.C.

(57) ABSTRACT

A method for evaluating classification models that are trained by using incomplete data sets for which data is known to be missing and the missing data is known to be non-random is provided. The method includes: receiving first information that relates to data to be used for training and evaluating a performance of a classification model that is designed to make a determination with respect to a particular query; analyzing the first information to determine second information that relates to a known portion of the first information and third information that relates to missing data; estimating, based on the third information, an uncertainty that corresponds to the missing data; and calculating, based on the second information and the estimated uncertainty, a first Gaussian approximation to a performance metric that relates to the first classification model.

14 Claims, 6 Drawing Sheets

METHOD AND SYSTEM FOR EVALUATION OF CLASSIFICATION MODELS

CROSS-REFERENCE TO RELATED APPLICATIONS

This application is being filed concurrently on Oct. 10, 2023 with U.S. patent application Ser. No. 18/378,490, entitled "Method and System for Evaluation of Classification Models Using Graphical Model Tools"; the contents of which are hereby incorporated by reference in its entirety.

BACKGROUND

1. Field of the Disclosure

This technology generally relates to methods and systems for evaluating classification models, and more particularly to methods and systems for evaluating classification models that are trained by using incomplete data sets for which data is known to be missing and the missing data is known to be non-random.

2. Background Information

In applications of Machine Learning (ML) for classification, there is a demand for data labels for training and evaluation. The ML model learns to associate input features to labels, given a set of labeled examples called the training set, where each example is a pair that includes features and a label (i.e., features, label). The ML model is evaluated on some unseen set of examples called an evaluation set, again presented as labeled pairs, where now the model only has access to the features. The model developer does have the true labels, which are then used to assess the trained ML model. There are many different performance metrics that can be computed on the evaluation set, always capturing some aspect of how well the ML model was able to learn an association between features and labels.

Reality deviates from the stylized scenario described above. In particular, the model developer does not always have access to all of the true labels in the evaluation set. Conventional practical solutions to this usually involve simply ignoring the examples where the label is missing. When these examples are very rare, this may be reasonable. However, if there is a larger fraction of such examples, ignoring this data may result in a statistically biased estimate for the performance metric of interest. This is of most concern when the probability of a label being missing depends upon the label itself for example, medical patients who are smokers are less likely to report that they smoke.

In the domain of Fraud Detection in Payments Networks, ML classifiers are typically used to mark certain transactions to be blocked, if they are deemed to be fraudulent, or passed through the payments system. In this context, the features include the details of the transaction and the label indicates whether or not the transaction is fraudulent. Very often there is a delay in receiving the true label, and sometimes the true label is never recovered. Moreover, to have the most accurate possible estimate of performance, the most recent data needs to be included in the evaluation data. This information may be used in downstream decisions, perhaps to switch between models or retrain an existing model.

This missing label phenomenon exists in other domains. For example, survey respondents with high income are less likely to report their true incomes, or medical patients who are smokers are less likely to report they smoke to medical professionals.

Issues that may arise due to missing data labels include the following: 1) Bias of trained ML model. If there are missing labels in the training data, then the trained model may be statistically biased. 2) Bias of Performance Metric on Evaluation Data. The evaluation will be statistically biased if there are missing labels in the training data. 3) Unquantified Bias. The size of the statistical bias may not be quantified and indeed may be unquantifiable in practice without further assumptions.

Accordingly, there is a need for a mechanism for evaluating classification models that are trained by using incomplete data sets for which data is known to be missing and the missing data is known to be non-random.

SUMMARY

The present disclosure, through one or more of its various aspects, embodiments, and/or specific features or sub-components, provides, inter alia, various systems, servers, devices, methods, media, programs, and platforms for methods and systems for evaluating classification models that are trained by using incomplete data sets for which data is known to be missing and the missing data is known to be non-random.

According to an aspect of the present disclosure, a method for evaluating a classification model is provided. The method is implemented by at least one processor. The method includes: receiving, by the at least one processor, first information that relates to first data to be used for training and evaluating a performance of a first classification model that is designed to make a determination with respect to a predetermined query; analyzing, by the at least one processor, the first information to determine second information that relates to a known portion of the first information and third information that relates to missing data; estimating, by the at least one processor based on the third information, an uncertainty that corresponds to the missing data; and calculating, by the at least one processor based on the second information and the estimated uncertainty, a first Gaussian approximation to a performance metric that relates to the first classification model.

The first data may include a set of ordered pairs, each ordered pair including a respective set of features and a respective label that is associated with the respective set of features.

When the third information indicates that there is no missing data, the performance of the first classification model may be evaluatable by using a subset of the first data within which the respective label is removed from each corresponding ordered pair.

The missing data may have a non-random distribution with respect to the respective sets of features and the respective labels included in the first data.

The performance metric may include at least one from among a value detection rate, a precision, and a recall.

The calculating of the first Gaussian approximation to the performance metric may include estimating a mean value of the performance metric and estimating a variance value of the performance metric.

The calculating of the first Gaussian approximation to the performance metric may include: calculating a second Gaussian approximation to a subset of the first information that corresponds to a particular determination with respect to the predetermined query; calculating a third Gaussian approximation to a subset of the first information that is determined by the first classification model as corresponding to the particular determination with respect to the predetermined query; and calculating the first Gaussian approximation as a ratio between the second Gaussian approximation and the third Gaussian approximation.

The predetermined query may relate to at least one from among a financial fraud detection query, an infectious disease classification query, and an e-commerce data stream query.

The estimating of the uncertainty may include applying a maximum entropy principle with respect to the third information.

According to another exemplary embodiment, a computing apparatus for evaluating a classification model is provided. The computing apparatus includes a processor; a memory; and a communication interface coupled to each of the processor and the memory. The processor is configured to: receive, via the communication interface, first information that relates to first data to be used for training and evaluating a performance of a first classification model that is designed to make a determination with respect to a predetermined query; analyze the first information to determine second information that relates to a known portion of the first information and third information that relates to missing data; estimate, based on the third information, an uncertainty that corresponds to the missing data; and calculate, based on the second information and the estimated uncertainty, a first Gaussian approximation to a performance metric that relates to the first classification model.

The first data may include a set of ordered pairs, each ordered pair including a respective set of features and a respective label that is associated with the respective set of features.

When the third information indicates that there is no missing data, the performance of the first classification model may be evaluatable by using a subset of the first data within which the respective label is removed from each corresponding ordered pair.

The missing data may have a non-random distribution with respect to the respective sets of features and the respective labels included in the first data.

The performance metric may include at least one from among a value detection rate, a precision, and a recall.

The processor may be further configured to calculate the first Gaussian approximation to the performance metric by estimating a mean value of the performance metric and estimating a variance value of the performance metric.

The processor may be further configured to calculate the first Gaussian approximation to the performance metric by: calculating a second Gaussian approximation to a subset of the first information that corresponds to a particular determination with respect to the predetermined query; calculating a third Gaussian approximation to a subset of the first information that is determined by the first classification model as corresponding to the particular determination with respect to the predetermined query; and calculating the first Gaussian approximation as a ratio between the second Gaussian approximation and the third Gaussian approximation.

The predetermined query may relate to at least one from among a financial fraud detection query, an infectious disease classification query, and an e-commerce data stream query.

The processor may be further configured to estimate the uncertainty by applying a maximum entropy principle with respect to the third information.

According to yet another exemplary embodiment, a non-transitory computer readable storage medium storing instructions for evaluating a classification model is provided. The storage medium includes a set of executable code which, when executed by a processor, causes the processor to: receive first information that relates to first data to be used for training and evaluating a performance of a first classification model that is designed to make a determination with respect to a predetermined query; analyze the first information to determine second information that relates to a known portion of the first information and third information that relates to missing data; estimate, based on the third information, an uncertainty that corresponds to the missing data; and calculate, based on the second information and the estimated uncertainty, a first Gaussian approximation to a performance metric that relates to the first classification model.

The first data may include a set of ordered pairs, each ordered pair including a respective set of features and a respective label that is associated with the respective set of features.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
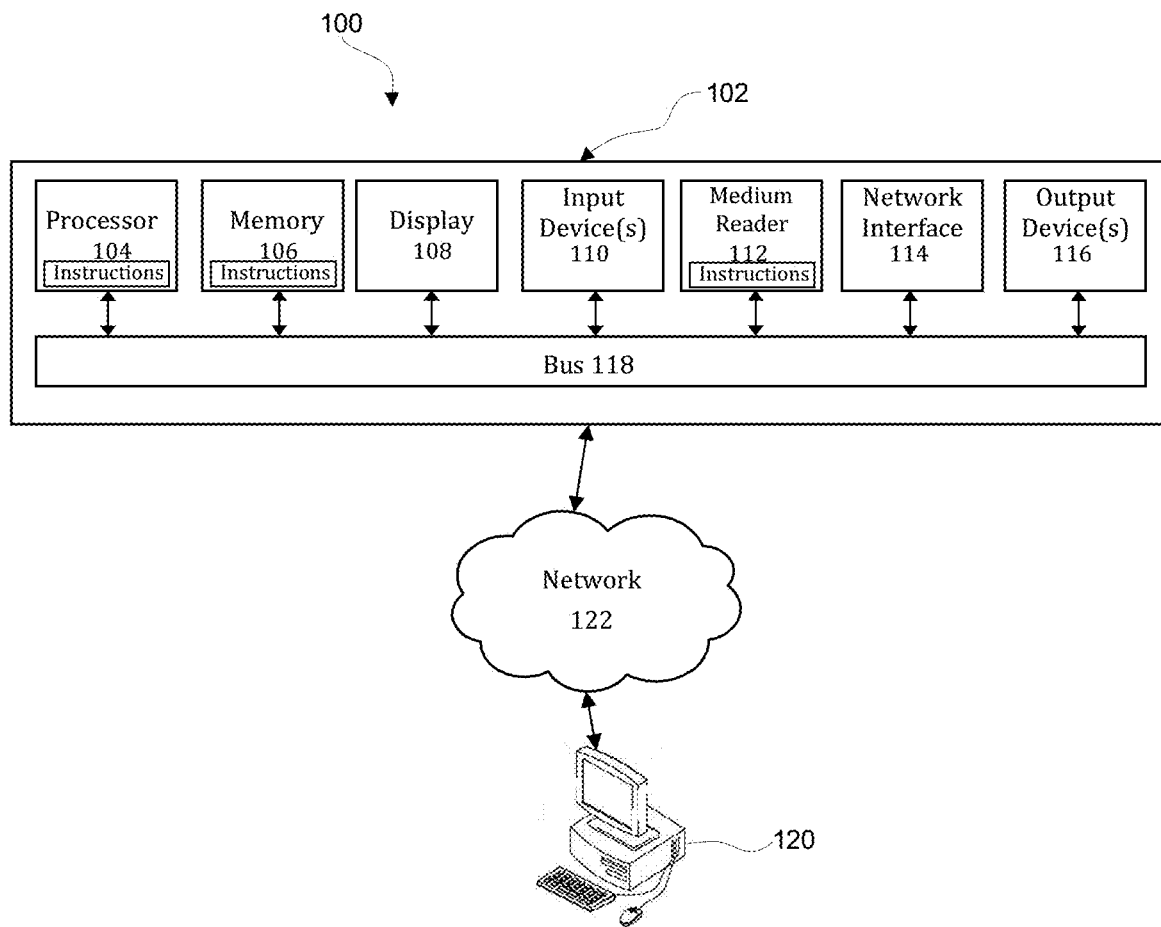
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for evaluating classification models that are trained by using incomplete data sets for which data is known to be missing and the missing data is known to be non-random.

Figure 2:
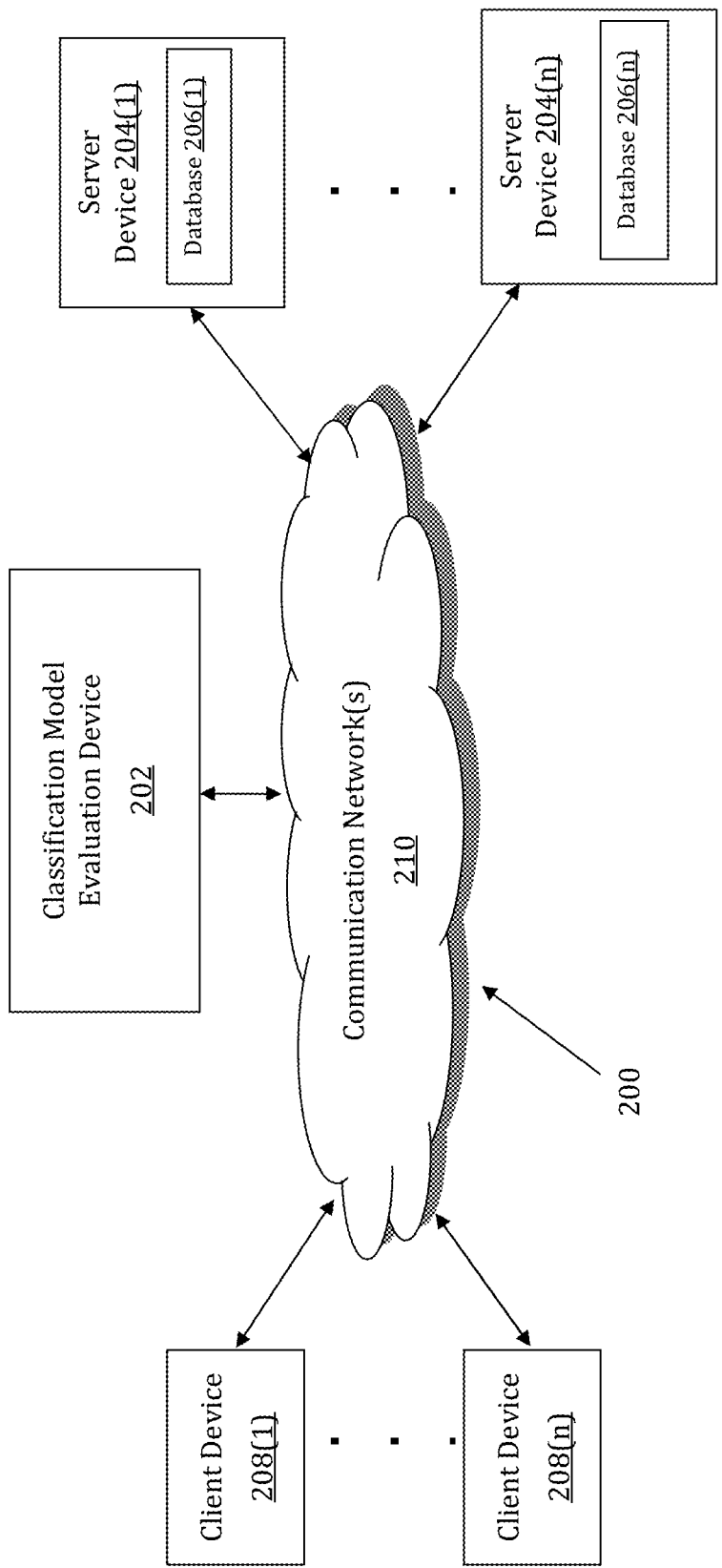
FIG. 2 illustrates an exemplary diagram of a network environment.

Referring to FIG. 2, a schematic of an exemplary network environment 200 for implementing a method for evaluating classification models that are trained by using incomplete data sets for which data is known to be missing and the missing data is known to be non-random is illustrated. In an exemplary embodiment, the method is executable on any networked computer platform, such as, for example, a personal computer (PC).

The method for evaluating classification models that are trained by using incomplete data sets for which data is known to be missing and the missing data is known to be non-random may be implemented by a Classification Model Evaluation (CME) device 202. The CME device 202 may be the same or similar to the computer system 102 as described with respect to FIG. 1. The CME device 202 may store one or more applications that can include executable instructions that, when executed by the CME device 202, cause the CME device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CME device 202 itself, may be located in virtual server(s) running in a cloud-based computing environment rather than being tied to one or more specific physical network computing devices. Also, the application(s) may be running in one or more virtual machines (VMs) executing on the CME device 202. Additionally, in one or more embodiments of this technology, virtual machine(s) running on the CME device 202 may be managed or supervised by a hypervisor.

In the network environment 200 of FIG. 2, the CME device 202 is coupled to a plurality of server devices 204(1)-204(n) that hosts a plurality of databases 206(1)-206(n), and also to a plurality of client devices 208(1)-208(n) via communication network(s) 210. A communication interface of the CME device 202, such as the network interface 114 of the computer system 102 of FIG. 1, operatively couples and communicates between the CME device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CME device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CME devices that efficiently implement a method for evaluating classification models that are trained by using incomplete data sets for which data is known to be missing and the missing data is known to be non-random.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CME device 202 may be a standalone device or integrated with one or more other devices or apparatuses, such as one or more of the server devices 204(1)-204(n), for example. In one particular example, the CME device 202 may include or be hosted by one of the server devices 204(1)-204(n), and other arrangements are also possible. Moreover, one or more of the devices of the CME device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CME device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store historical model training data and data that relates to performance metrics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CME device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CME device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CME device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CME device 202, the server devices 204(1)-204(n), or the client devices 208(1)-208(n), for example, may be configured to operate as virtual instances on the same physical machine. In other words, one or more of the CME device 202, the server devices 204(1)-204(n), or the client devices 208(1)-208(n) may operate on the same physical device rather than as separate devices communicating through communication network(s) 210. Additionally, there may be more or fewer CME devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the internet, intranets, and combinations thereof.

Figure 3:
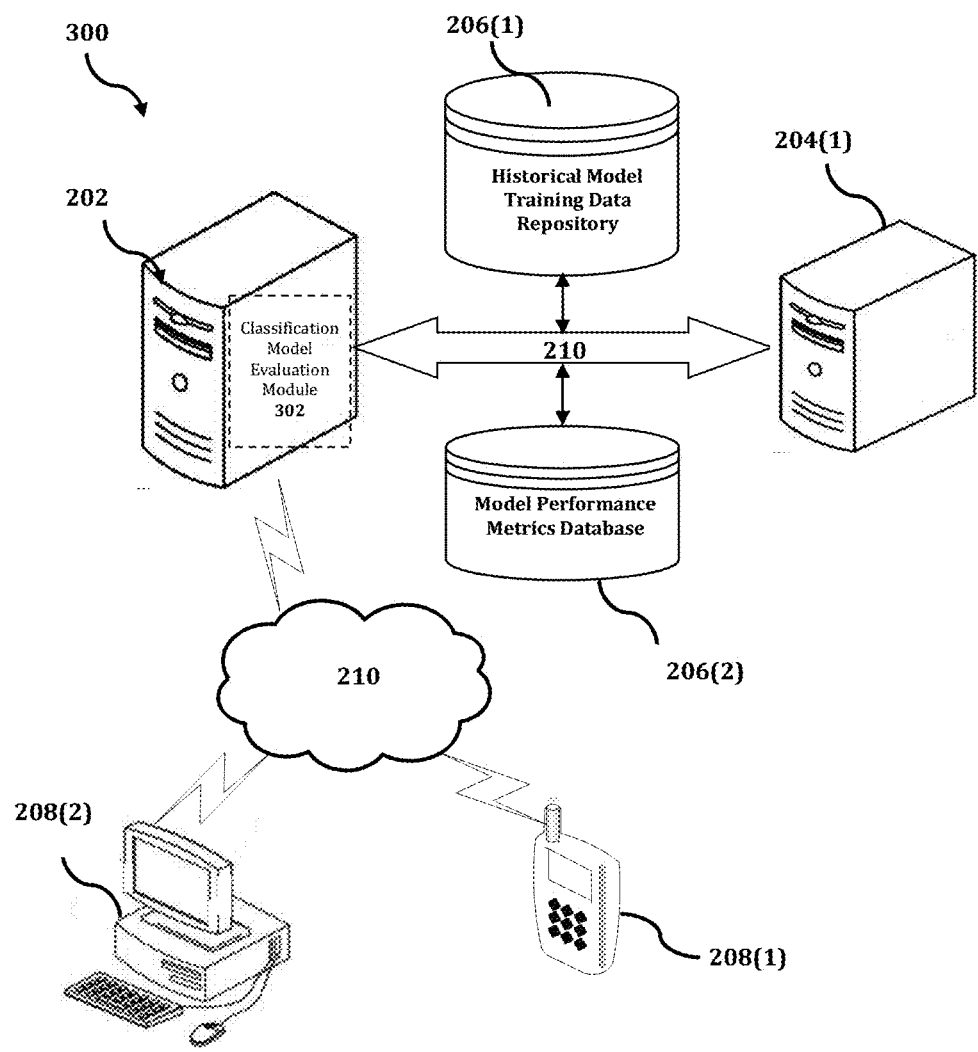
FIG. 3 shows an exemplary system for implementing a method for evaluating classification models that are trained by using incomplete data sets for which data is known to be missing and the missing data is known to be non-random.

The CME device 202 is described and illustrated in FIG. 3 as including a classification model evaluation module 302, although it may include other rules, policies, modules, databases, or applications, for example. As will be described below, the classification model evaluation module 302 is configured to implement a method for evaluating classification models that are trained by using incomplete data sets for which data is known to be missing and the missing data is known to be non-random.

An exemplary process 300 for implementing a mechanism for evaluating classification models that are trained by using incomplete data sets for which data is known to be missing and the missing data is known to be non-random by utilizing the network environment of FIG. 2 is illustrated as being executed in FIG. 3. Specifically, a first client device 208(1) and a second client device 208(2) are illustrated as being in communication with CME device 202. In this regard, the first client device 208(1) and the second client device 208(2) may be "clients" of the CME device 202 and are described herein as such. Nevertheless, it is to be known and understood that the first client device 208(1) and/or the second client device 208(2) need not necessarily be "clients" of the CME device 202, or any entity described in association therewith herein. Any additional or alternative relationship may exist between either or both of the first client device 208(1) and the second client device 208(2) and the CME device 202, or no relationship may exist.

Further, CME device 202 is illustrated as being able to access a historical model training data repository 206(1) and a model performance metrics database 206(2). The classification model evaluation module 302 may be configured to access these databases for implementing a method for evaluating classification models that are trained by using incomplete data sets for which data is known to be missing and the missing data is known to be non-random.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CME device 202 via broadband or cellular communication. Of course, these embodiments are merely exemplary and are not limiting or exhaustive.

Upon being started, the classification model evaluation module 302 executes a process for evaluating classification models that are trained by using incomplete data sets for which data is known to be missing and the missing data is known to be non-random. An exemplary process for evaluating classification models that are trained by using incomplete data sets for which data is known to be missing and the missing data is known to be non-random is generally indicated at flowchart 400 in FIG. 4.

Figure 4:
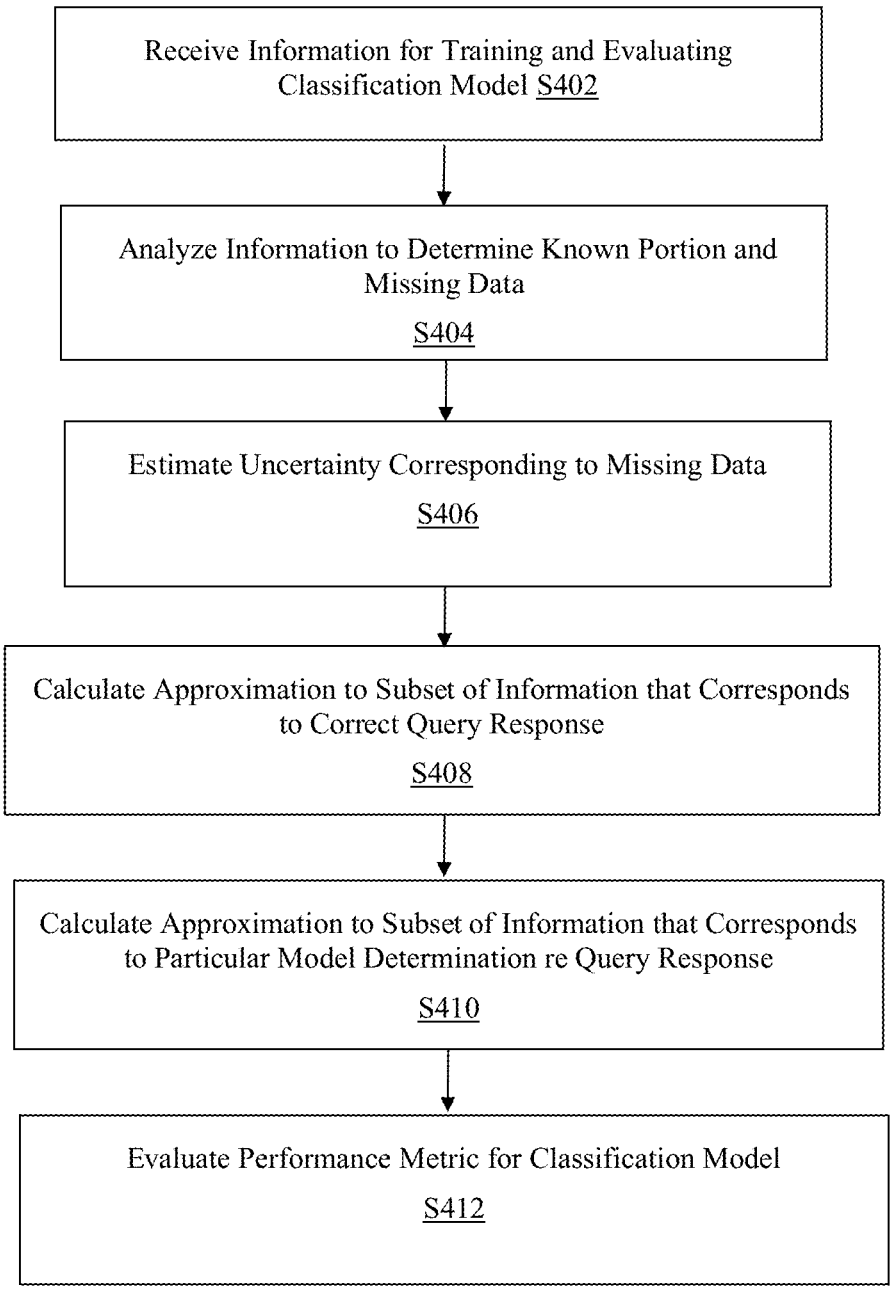
FIG. 4 is a flowchart of an exemplary process for implementing a method for evaluating classification models that are trained by using incomplete data sets for which data is known to be missing and the missing data is known to be non-random.

In process 400 of FIG. 4, at step S402, the classification model evaluation module 302 receives first information that relates to first data to be used for training and evaluating a performance of a first classification model that is designed to make a determination with respect to a predetermined query. In an exemplary embodiment, the first classification model may be trained to provide answers to queries that relate to any one or more of a financial fraud detection operation, an infectious disease classification, and/or a data stream issue that relates to e-commerce.

In an exemplary embodiment, the first information may include a set of ordered pairs, and each ordered pair may include a respective set of features and a respective label that is associated with the respective set of features. In a situation where the first classification model is designed to make a determination with respect to a financial fraud detection operation, for a single ordered pair within the first information, the set of features may include financial details of a particular transaction, and the label may indicate whether or not the particular transaction is a fraudulent transaction.

At step S404, the classification model evaluation module 302 analyzes the first information in order to determine second information that relates to a known portion of the first information and third information that relates to missing data. In this aspect, for any ordered pair for which a label is missing, a result of the analysis performed in step S404 may indicate that any such ordered pair represents missing data. As an example, in a scenario where a survey is provided to a group and one question relates to an income level of each respondent, there is generally a greater likelihood that respondents with higher incomes will not truthfully report their incomes. As another example, if a question relates to medical history, there is generally a greater likelihood that smokers will not truthfully report the fact that they smoke to a medical professional.

In an exemplary embodiment, in a situation for which there is no missing data, as a result it is trivial to evaluate a performance of the first classification model by simply removing labels from a subset of the original set of ordered pairs and then using the first classification model to determine the labels for that subset, and if the first classification model correctly determines each label, then it is seen that the model has performed as expected. Further, to the extent that there is missing data but the missing data is random with respect to the features and the labels, it may be reasonably assumed that such "missingness" would likely have a relatively insignificant impact upon the ability to accurately train the first classification model to respond to queries. However, when the missing data is non-random with respect to the features and the labels, then the non-randomness of the missing data is much more likely to skew the ability to accurately train the first classification model, because the non-randomness of the missing data would be reflected in query responses that correspond to circumstances that are similar to those that would otherwise have been present in the missing data.

At step S406, the classification model evaluation module 302 estimates an uncertainty with respect to the missing data. In an exemplary embodiment, in order to estimate this uncertainty, the following mathematical construct may be used: First, suppose that b represents a vector that contains all missing values, and B is a random variable that describes the uncertainty thereof, and Y is a random variable that follows a distribution over bitstrings that encode possible patterns of labels that could accompany various features. Then the distribution of B is equivalent to the distribution of b. Y. Further, in an exemplary embodiment, in order to determine this distribution, a principle known as the Maximum Entropy principle may be invoked. According to the Maximum Entropy principle, the distribution encoding the greatest uncertainty is that which maximizes Shannon entropy, i.e., a distribution that maximizes $H(\{p_i\})=-\Sigma_i p_i \log p_i$ where $\{p_i\}$ is the probability distribution that is used to describe uncertainty over discrete outcomes i.

At step S408, the classification model evaluation module 302 calculates an approximation to a subset of the first information that corresponds to a correct response to a query being handled by the first classification model, and at step S410, the classification model evaluation module 302 calculates an approximation to a different subset of the first information that corresponds to a response to the same query that is correctly determined by the first classification model. For each of step S408 and step S410, the approximation may be calculated by using an assumption that the quantity being estimated has a Gaussian distribution that has a particular mean value u and a particular variance value $\sigma^2$. Further mathematical details regarding these calculations are described below.

At step S412, the classification model evaluation module 302 calculates an approximation to a performance metric that relates to the first classification model. In an exemplary embodiment, the performance metric may include any one or more of a value detection rate (VDR), a precision of the first classification model, and/or a recall of the first classification model. In an exemplary embodiment, in order to calculate an approximation of the VDR, the approximations calculated in steps S408 and S410 may be used as a numerator and a denominator, respectively, in a ratio that is assumed as being equivalent to a random variable for which the numerator and denominator are jointly Gaussian with a particular variance. Further mathematical details regarding these calculations are described below.

In an exemplary embodiment, an objective of the present disclosure is to answer the following broad research question: "Suppose the following elements are provided: a machine learning (ML) model for classification, a performance metric for the classifier and an evaluation set with missing data labels. How does one rigorously describe an uncertainty about the value of the performance metric in a statistically unbiased way, with as few assumptions about the underlying data distribution as possible?"

Figure 5:
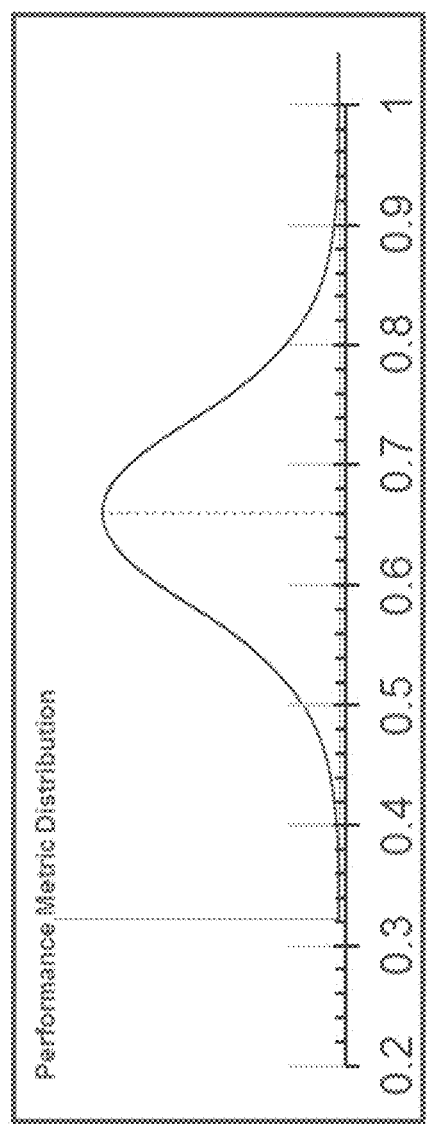
FIG. 5 is a diagram that illustrates a plausible distribution for a machine learning model performance metric that is usable in an execution of a method for evaluating classification models that are trained by using incomplete data sets for which data is known to be missing and the missing data is known to be non-random, according to an exemplary embodiment.

FIG. 5 is a diagram 500 that illustrates a plausible distribution for a machine learning model performance metric that is usable in an execution of a method for evaluating classification models that are trained by using incomplete data sets for which data is known to be missing and the missing data is known to be non-random, according to an exemplary embodiment. In an exemplary embodiment, a solution to the broad research question posed above takes the form shown in FIG. 5 of a plausible normal distribution for the true value of the performance metric under consideration for an ML classifier on a particular evaluation set that has missing labels.

Classification metrics take the form of a ratio: numerator divided by denominator. In an exemplary embodiment, a solution follows the following sequence of steps: 1) Decompose numerator and denominator of classification metric into known and missing parts, corresponding to data examples with known and unknown labels. 2) Compute Gaussian approximations to numerator and denominator of classification metric. 3) Compute Gaussian approximation to the ratio distribution.

The main techniques used to solve the problem include classical statistics tools and algebra for evaluating means, variances and covariances of relevant quantities. The Gaussian approximations for numerator and denominator arise from the missing labels, where the distribution the Gaussian is approximating is induced by the Maximum Entropy distribution of data labels.

Step 1—Decomposition into Known and Missing Components: In an exemplary embodiment, a Value Detection Rate (VDR) is selected as a performance metric to be used for evaluating a classification model. For the financial fraud detection use case, VDR may be defined as follows:

$$VDR = \frac{\text{Total Fraudulent amount captured by classifier}}{\text{Total Fraudulent amount in evaluation set}}$$
$$= \frac{\text{Known captured} + \text{Missing captured fraud}}{\text{Known Fraud} + \text{Missing Fraud}}$$
$$= \frac{\alpha + A}{\beta + B}$$

where $\alpha$, $\beta$ are constants computed from labels and transaction values in evaluation set; and A, B are random variables describing the uncertainty arising in missing captured and total fraudulent dollar value.

Let b be the vector containing all missing transaction values. Then the distribution of B is the distribution of b·Y, where the random variable Y follows some distribution over bitstrings, since each bitstring encodes one possible pattern of fraud labels that transactions could possibly take.

To determine this distribution, advantageous use is made of the Maximum Entropy principle, which dictates that the distribution encoding the greatest uncertainty is that which maximizes Shannon entropy, that is, the distribution that maximizes $H(\{p_i\}) = -\Sigma_i p_i \log p_i$ where $\{p_i\}$ is the probability distribution we are using to describe uncertainty over discrete outcomes i.

The maximum entropy distribution for a set of discrete outcomes in the absence of further testable information is uniform, which is used in the following example. The uniform distribution over bitstrings length k is same as independently flipping k fair coins, so $B \sim \Sigma_i b_i Y_i$ where $Y_i \sim \text{Bernoulli}(p)$ independently and identically distributed (iid) for $$p = \frac{1}{2}.$$

Step 2—Gaussian Approximations to Numerator and Denominator: One now asks: What is the distribution of $B \sim \Sigma_i b_i Y_i$ where $Y_i \sim \text{Bernoulli}(p_i)$ iid for $p_i \in (0, 1)$? As a response, the following is shown:

Theorem: When $$\frac{\|b\|_\infty}{\|b\|_1} \ll 1 \text{ and } p_i(1-p_i) \gg 0,$$

i.e. no particular value dominates the sum and Bernoulli parameters are bounded away from 0 and 1, then $$B \to \mathcal{N}(\mu_b, \sigma_b^2)$$
$$\mu_b = \sum_i b_i p_i,$$
$$\sigma_b = \sum_i b_i^2 p_i (1-p_i).$$

Moreover, let $a = b \odot \psi$ be the vector of fraudulent values masked by whether the classifier has captured the transaction or not, that is $a_i = b_i \psi(x_i)$ where $\psi(x_i) = 1$ if transaction $x_i$ captured, 0 otherwise. Then, it is also true that $A \sim \Sigma \Sigma_i a_i Y_i$ follows $\mathcal{N}(\mu_a, \sigma_a^2)$ with $\mu_a = \Sigma_i p_i a_i$, $\sigma_a = \Sigma_i a_i^2 p_i (1-p_i)$. Moreover, $\text{cov}(A, B) = \Sigma_i p_i (1-p_i) a_i$.

To summarize: 1) $A \sim \Sigma_i a_i Y_i$ follows $\mathcal{N}(\mu_a, \sigma_a^2)$ with $\sigma_a = \Sigma \Sigma_i a_i$, $\sigma_a = \Sigma_i p_i (1-p_i) a_i^2$. 2) $B \sim \Sigma_i b_i Y_i$ follows $\mathcal{N}(\mu_b, \sigma_b^2)$ with $\mu_b = \Sigma_i p_i b_i$, $\sigma_b = \Sigma_i p_i (1-p_i) b_i^2$. 3) $\text{cov}(A, B) = \Sigma_i p_i (1-p_i) a_i b_i$.

Therefore, all of the necessary ingredients are present in order to compute the distribution of $$VDR = \frac{\alpha + A}{\beta + B}$$

Let $Z=\alpha+A$, $W=\beta+B$. Then 1) Z follows $\mathcal{N}(\mu_z, \sigma_z^2)$ with $\mu_z=\alpha+\Sigma_i p_i a_i$, $\sigma_z=\Sigma\Sigma_i p_i(1-p_i)a_i^2$. 2) W follows $\mathcal{N}(\mu_w, \sigma_w^2)$ with $\mu_w=\beta+\Sigma_i p_i b_i$, $\sigma_w=\Sigma_i p_i(1-p_i)b_i^2$. 3) $cov(Z, W)=\Sigma_i p_i(1-p_i)a_i b_i$.

$$VDR = \frac{Z}{W}$$

is a ratio of Gaussian random variables.

Step 3—Compute Gaussian approximation to the ratio distribution: It can be shown that the random variable $$\frac{Z}{W}$$

where Z, W are jointly Gaussian with covariance c, and W>>0, also approximately follows a Gaussian $$\frac{Z}{W} \sim \mathcal{N}(\mu, \sigma),$$

where $$\mu = \frac{\mu_z}{\mu_w},$$

$$\sigma = \frac{\mu_z^2 \sigma_w^2 + \mu_w^2 \sigma_z^2 - 2c\mu_w\mu_z}{\mu_w^2 \sqrt{(\mu_w \sigma_z^2 - 2c\mu_z)\mu_w + (\mu_z^2 + 3\sigma_z^2 + 6\mu(2c - \sigma_w^2 \mu))\sigma_w^2 - 9c^2}}.$$

Substituting in the computed values setting $$p_i = \frac{1}{2}$$

for all Bernoulli values, together with the relevant data from the evaluation yields the mean and standard deviation of a Gaussian Distribution that describes the uncertainty for the VDR metric of a given classifier $\psi$ on an evaluation set containing missing labels.

A similar construction applies to any classification metric of interest, such as precision or recall.

Figure 6:
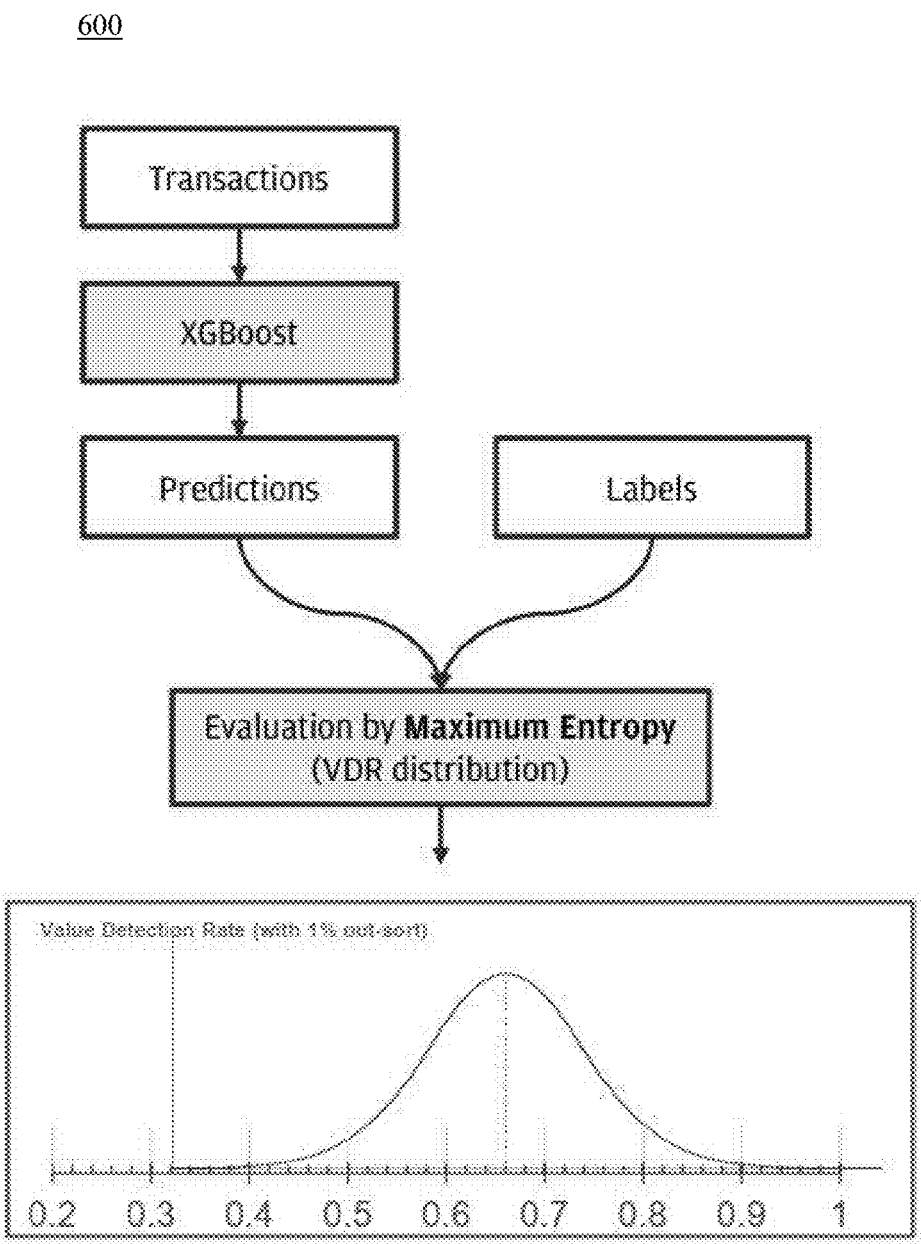
FIG. 6 is a diagram that illustrates a workflow of a system that implements a method for evaluating classification models that are trained by using incomplete data sets for which data is known to be missing and the missing data is known to be non-random, according to an exemplary embodiment.

FIG. 6 is a diagram 600 that illustrates a workflow of a system that implements a method for evaluating classification models that are trained by using incomplete data sets for which data is known to be missing and the missing data is known to be non-random, according to an exemplary embodiment.

As shown in FIG. 6, first information (labeled herein as "Transactions") is provided as an input to a classification model (labeled herein as "XGBoost"), which then makes determinations as to whether or not each inputted transaction is fraudulent. The resulting determinations are then outputted as "Predictions", which are then inputted into a module that is designed to evaluate the performance of the classification model, such as, for example, classification model evaluation module 302. Separately, a set of labels is also inputted into the evaluation module, and an evaluation of the classification model is performed. In an exemplary embodiment, the evaluation is performed by using the maximum entropy principle with respect to an uncertainty of the missing data, and the output is a Gaussian approximation of the value detection rate (VDR) distribution.

In an exemplary embodiment, the invention may be used for any of various types of use cases. The following is a description of several example use cases:

Use case 1: Financial Fraud Detection. In many instances, labels describing whether a particular transaction is fraudulent or not have a delay in being received. When evaluating how well a classifier is catching fraud, it is useful to evaluate both the worst and best possible case for the metric being used on the test data being measured against, or a distribution over all possible values with their plausibility.

Use case 2: Infectious disease classifier. In some situations, a classification model may be used to predict the chance of an individual having an infectious disease given some symptoms the individual is showing. Some of the population of individuals in the test data may not have labels for whether or not they have the disease. Perhaps there is a delay in waiting for lab results, or the patient may decline to answer. In this instance, it is preferred not to ignore these individuals when evaluating the model accuracy, but may be desirable to obtain a distribution over the accuracy of the model.

Use case 3: Data stream issues in e-commerce. In modern data-intensive applications for e-commerce, data is drawn from many different sources and databases and combined for use by downstream Machine Learning (ML) models. Suppose that the performance of an ML classification model is being monitored using some metric. Then, one of the data feeds supplying the label, e.g., whether a customer makes a purchase or not, goes down temporarily. If this missing data is ignored, then the values for the metric will have a biased value. It would instead be preferable to obtain a distribution over plausible values for this metric.

Accordingly, with this technology, a process for evaluating classification models that are trained by using incomplete data sets for which data is known to be missing and the missing data is known to be non-random is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for evaluating a classification model, the method being implemented by at least one processor, the method comprising:
    receiving, by the at least one processor, first information that relates to first data to be used for training and evaluating a performance of a first classification model that is designed to make a determination with respect to a predetermined query;
    analyzing, by the at least one processor, the first information to determine second information that relates to a known portion of the first information and third information that relates to missing data;
    estimating, by the at least one processor based on the third information, an uncertainty that corresponds to the missing data; and
    calculating, by the at least one processor based on the second information and the estimated uncertainty, a first Gaussian approximation to a performance metric that relates to the first classification model,
    wherein the first data is an incomplete data set for which data is known to be missing, and
    wherein the predetermined query relates to at least one from among a financial fraud detection query, an infectious disease classification query, and an e-commerce data stream query, and
    wherein the calculating of the first Gaussian approximation to the performance metric comprises estimating a mean value of the performance metric and estimating a variance value of the performance metric.

2. The method of claim 1, wherein the first data includes a set of ordered pairs, each ordered pair including a respective set of features and a respective label that is associated with the respective set of features.

3. The method of claim 2, wherein the missing data has a non-random distribution with respect to the respective sets of features and the respective labels included in the first data.

4. The method of claim 1, wherein the performance metric includes at least one from among a value detection rate, a precision, and a recall.

5. The method of claim 1, wherein the calculating of the first Gaussian approximation to the performance metric comprises:
    calculating a second Gaussian approximation to a subset of the first information that corresponds to a particular determination with respect to the predetermined query;

calculating a third Gaussian approximation to a subset of the first information that is determined by the first classification model as corresponding to the particular determination with respect to the predetermined query; and calculating the first Gaussian approximation as a ratio between the second Gaussian approximation and the third Gaussian approximation.

6. The method of claim 1, wherein the estimating of the uncertainty comprises applying a maximum entropy principle with respect to the third information.

7. A computing apparatus for evaluating a classification model, the computing apparatus comprising:
a processor;
a memory; and
a communication interface coupled to each of the processor and the memory,
wherein the processor is configured to:
receive, via the communication interface, first information that relates to first data to be used for training and evaluating a performance of a first classification model that is designed to make a determination with respect to a predetermined query;
analyze the first information to determine second information that relates to a known portion of the first information and third information that relates to missing data;
estimate, based on the third information, an uncertainty that corresponds to the missing data; and
calculate, based on the second information and the estimated uncertainty, a first Gaussian approximation to a performance metric that relates to the first classification model,
wherein the first data is an incomplete data set for which data is known to be missing, and
wherein the predetermined query relates to at least one from among a financial fraud detection query, an infectious disease classification query, and an e-commerce data stream query, and
wherein the processor is further configured to calculate the first Gaussian approximation to the performance metric by estimating a mean value of the performance metric and estimating a variance value of the performance metric.

8. The computing apparatus of claim 7, wherein the first data includes a set of ordered pairs, each ordered pair including a respective set of features and a respective label that is associated with the respective set of features.

9. The computing apparatus of claim 8, wherein the missing data has a non-random distribution with respect to the respective sets of features and the respective labels included in the first data.

10. The computing apparatus of claim 7, wherein the performance metric includes at least one from among a value detection rate, a precision, and a recall.

11. The computing apparatus of claim 7, wherein the processor is further configured to calculate the first Gaussian approximation to the performance metric by:
calculating a second Gaussian approximation to a subset of the first information that corresponds to a particular determination with respect to the predetermined query;
calculating a third Gaussian approximation to a subset of the first information that is determined by the first classification model as corresponding to the particular determination with respect to the predetermined query; and
calculating the first Gaussian approximation as a ratio between the second Gaussian approximation and the third Gaussian approximation.

12. The computing apparatus of claim 7, wherein the processor is further configured to estimate the uncertainty by applying a maximum entropy principle with respect to the third information.

13. A non-transitory computer readable storage medium storing instructions for evaluating a classification model, the storage medium comprising a set of executable code which, when executed by a processor, causes the processor to:
receive first information that relates to first data to be used for training and evaluating a performance of a first classification model that is designed to make a determination with respect to a predetermined query;
analyze the first information to determine second information that relates to a known portion of the first information and third information that relates to missing data;
estimate, based on the third information, an uncertainty that corresponds to the missing data; and
calculate, based on the second information and the estimated uncertainty, a first Gaussian approximation to a performance metric that relates to the first classification model,
wherein the first data is an incomplete data set for which data is known to be missing, and
wherein the predetermined query relates to at least one from among a financial fraud detection query, an infectious disease classification query, and an e-commerce data stream query, and
wherein the calculating of the first Gaussian approximation to the performance metric comprises estimating a mean value of the performance metric and estimating a variance value of the performance metric.

14. The storage medium of claim 13, wherein the first data includes a set of ordered pairs, each ordered pair including a respective set of features and a respective label that is associated with the respective set of features.

* * * * *